(12) United States Patent
Lai et al.

(10) Patent No.: US 8,879,221 B2
(45) Date of Patent: Nov. 4, 2014

(54) ESD PROTECTION WITHOUT LATCH-UP

(75) Inventors: Da-Wei Lai, Singapore (SG); Mahadeva Iyer Natarajan, Clifton Park, NY (US); Manjunatha Govinda Prabhu, Singapore (SG); Ryan Shan, Singapore (SG)

(73) Assignee: GLOBALFOUNDRIES Singapore Pte. Ltd., Singapore (SG)

( * ) Notice: Subject to any disclaimer, the term of this patent is extended or adjusted under 35 U.S.C. 154(b) by 87 days.

(21) Appl. No.: 13/406,537

(22) Filed: Feb. 28, 2012

(65) Prior Publication Data

US 2013/0222952 A1    Aug. 29, 2013

(51) Int. Cl.
*H02H 9/04* (2006.01)
*H02H 3/20* (2006.01)

(52) U.S. Cl.
USPC ........... 361/56; 361/91.1; 361/91.8; 361/91.5

(58) Field of Classification Search
USPC ................... 361/56, 91.1, 91.8, 91.5
See application file for complete search history.

(56) References Cited

U.S. PATENT DOCUMENTS

| | | | | |
|---|---|---|---|---|
| 5,400,202 A | * | 3/1995 | Metz et al. | 361/56 |
| 6,850,397 B2 | * | 2/2005 | Russ et al. | 361/91.8 |
| 7,285,458 B2 | * | 10/2007 | Manna et al. | 438/237 |
| 7,457,086 B2 | * | 11/2008 | Chatty et al. | 361/56 |
| 7,470,957 B2 | * | 12/2008 | Gossner | 257/355 |

* cited by examiner

*Primary Examiner* — Zeev V Kitov
(74) *Attorney, Agent, or Firm* — Horizon IP Pte. Ltd.

(57) ABSTRACT

A device having an ESD module is disclosed. The ESD module includes an ESD circuit coupled between first and second rails and a control circuit coupled between the rails and to the ESD circuit. When the control circuit senses an ESD event, it causes the ESD circuit to create a current path between the rails to dissipate ESD current. When no ESD event is sensed, the control circuit ensures that no current path is created between the rails to prevent latch-up.

20 Claims, 7 Drawing Sheets

ESD PROTECTION WITHOUT LATCH-UP

BACKGROUND

A sudden discharge of static electricity or electrostatic discharge (ESD) may occur which can damage electronic devices, such as integrated circuits. To prevent damage to the device, ESD protection circuits are implemented. The ESD protection circuit dissipates ESD current during an ESD event.

However, conventional ESD protection circuits may be prone to latch-up. Latch-up is the creation of an undesirable current path between rails, such as $V_{DD}$ and ground, which causes large amounts of current to be drawn from the power supply. Latch-up may cause circuit malfunction and/or irreversible damage to the IC.

The disclosure is directed to a latch-up free ESD protection module.

SUMMARY

A device having an ESD module is disclosed. The ESD module includes an ESD circuit coupled between first and second rails and a control circuit coupled between the rails and to the ESD circuit. When the control circuit senses an ESD event, it causes the ESD circuit to create a current path between the rails to dissipate ESD current. When no ESD event is sensed, the control circuit ensures that no current path is created between the rails to prevent latch-up.

In another embodiment, a method of preventing latch-up in an ESD circuit is presented. The method includes providing an ESD circuit coupled between first and second rails. A control circuit is coupled between the rails and to the ESD circuit. The control circuit creates a current path in the ESD circuit between the rails to dissipate ESD current when an ESD event is sensed. The control circuit ensures that no current path is created between the rails in the ESD circuit to prevent latch-up when no ESD event is sensed.

In yet another embodiment, a method of forming a device is disclosed. The method includes providing a substrate and forming an ESD module on the substrate. The ESD module includes an ESD circuit coupled between first and second rails and a control circuit coupled between the rails and to the ESD circuit. The control circuit causes the ESD circuit to create a current path between the rails to dissipate ESD current when it senses an ESD event. When no ESD event is sensed, the control circuit ensures that no current path is created between the rails to prevent latch-up.

These and other advantages and features of the embodiments herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Embodiments generally relate to semiconductor devices. In one embodiment, the devices include an Electrostatic Discharge (ESD) circuit. The ESD circuit, for example, is activated during an ESD event to dissipate ESD current. The devices, for example, may be any type of semiconductor devices, such as integrated circuits (ICs). The ICs can be incorporated into or used with, for example, electronic products, computers, cell phones, and personal digital assistants (PDAs). The devices may also be incorporated into other types of products.

Figure 1:
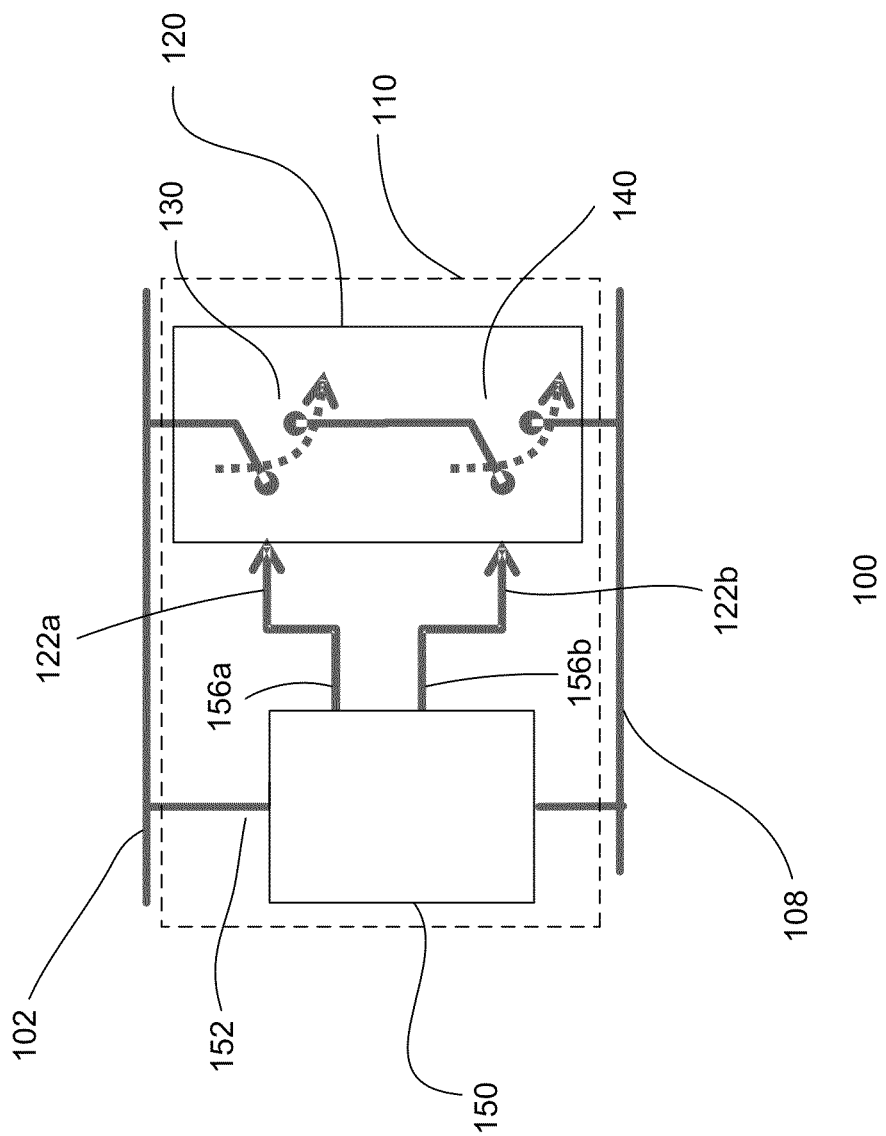
FIG. 1 shows a simplified block diagram of a portion of an embodiment of a device.

FIG. 1 shows a simplified block diagram of a portion of an embodiment of a device 100. As shown, the portion includes an ESD module 110. The ESD module is coupled between first and second rails 102 and 108 at which an ESD event may occur. The first rail may be an input/output (I/O) rail of a device. The I/O rail is coupled to an I/O pad of the device. In other embodiments, the first rail may be a power rail. The first rail, for example, may be coupled to a power pad, such as $V_{DD}$. The second rail, in one embodiment, is a ground rail. The second rail, for example, may be coupled to a ground pad, such as $V_{SS}$. The power and ground rails may be generally referred to as power rails. For example, $V_{DD}$ may be referred to as a high power rail while $V_{SS}$ may be referred to as a low power rail.

The ESD module includes a control circuit 150 and an ESD circuit 120. As shown, one control circuit is associated with one ESD circuit. Other configurations of the ESD circuit may also be useful. For example, a control circuit may be employed to control more than one ESD circuit. In one embodiment, the ESD circuit includes a silicon control rectifier (SCR) ESD circuit. Other types of ESD circuit may also be useful. The SCR ESD circuit forms a 4-layered PNPN structure formed in the substrate. The ESD circuit, in effect, includes first and second switches 130 and 140 which are coupled in series between the first and second rails. The first switch is coupled to the first rail and the second switch is coupled to the second rail. The ESD circuit includes first and second ESD inputs 122a-b. When both switches are closed, a current path is created between the rails. If either one of the switches is opened, no current path exists between the rails.

The control circuit is coupled between the rails. In one embodiment, the first rail is coupled to a control input 152. The control circuit includes first and second control outputs 156a-b which are coupled to the ESD inputs. Control output signals are generated at the control outputs by the control circuit to control the switches of the ESD circuit.

The control circuit causes the ESD module to operate in a first or a second operating mode. The first mode, for example, may be referred to as an ESD mode. The ESD mode is activated when an ESD event occurs. The second mode, for example, may be referred to as a latch-up test mode. The latch-up test mode is activated when there is no ESD event occurring. For example, the control circuit, in the absence of an ESD event, causes the ESD module to operate in the latch-up test mode. In the latch-up test mode, the device operates under the same operational condition as in normal operation.

In the first or ESD mode, when an ESD event is sensed, the control circuit generates first and second active ESD output signals to ensure that the first and second switches are closed to provide a current path between the rails to dissipate the ESD current. In one embodiment, the first active ESD output signal is a logic 0 (e.g., $V_{SS}$) signal and the second active ESD output signal is a logic 1 (e.g., $V_{DD}$) signal. Other configurations of active ESD output signals may also be useful.

In the second or latch-up test mode, the control circuit generates at least one inactive ESD output signals to ensure that one of the switches in the ESD circuit is open. Having at least one switch open results in no current path between the rails. This prevents the ESD circuit from suffering latch-up under latch-up test mode. In one embodiment, the control circuit generates a first inactive ESD output signal at the first control output to ensure that the first switch is open. In one embodiment, the first inactive ESD output signal is a logic 1 signal. As for the second control output signal at the second control output, it is a floated signal. The logic level of the floated signal depends on the previous state. Since the first switch is off, the state of the second switch does not matter. Other configurations of control output signals may also be useful.

Figure 2A:
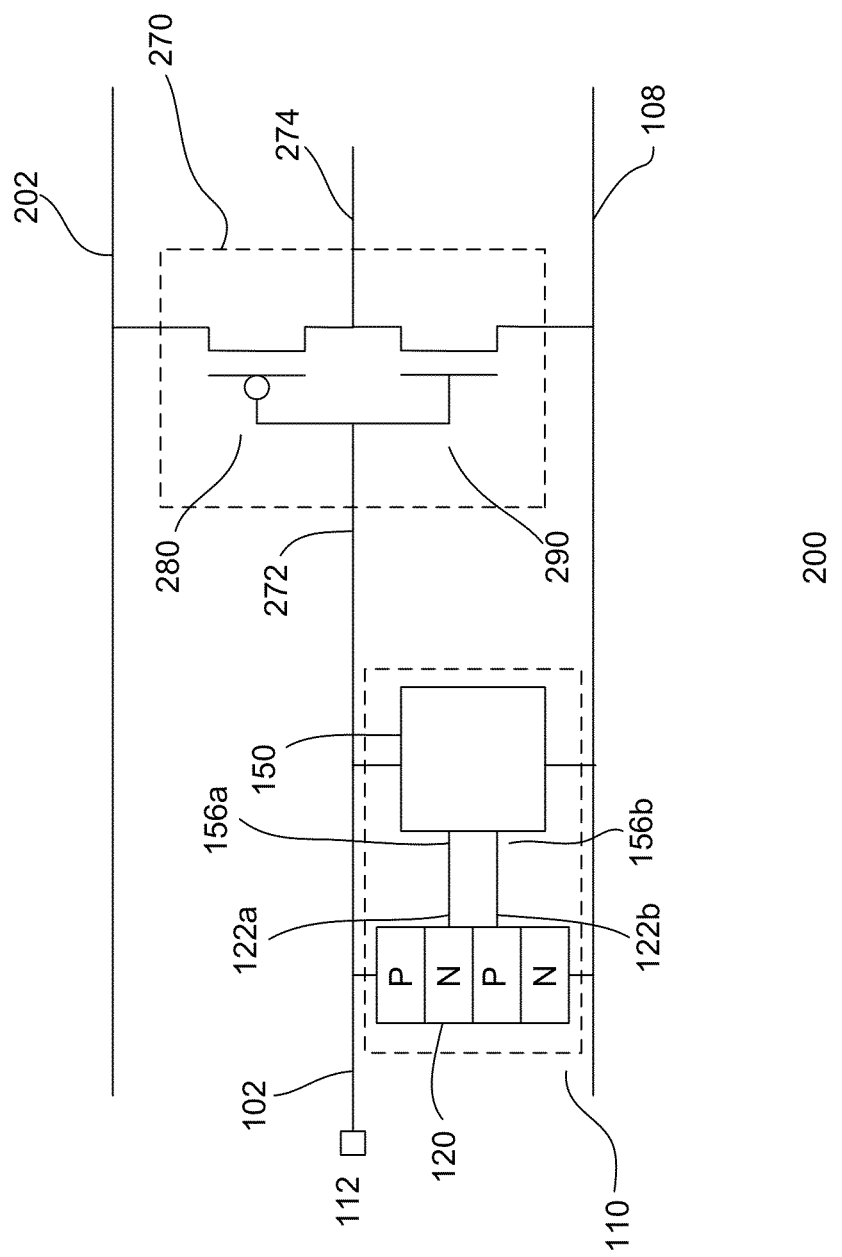
FIGS. 2a-c show embodiments of a portion of a device with an ESD module.

FIG. 2a shows a portion of another embodiment of a device 200. The portion includes an ESD module 110. The ESD module is coupled between first and second rails 102 and 108 at which an ESD event may occur. In one embodiment, the first rail is an I/O rail coupled to an I/O pad 112. The second rail, in one embodiment, is a ground rail. For example, the second rail may be coupled to a ground or $V_{SS}$. Other configuration of rails may also be useful.

The ESD module includes a control circuit 150 and an ESD circuit 120. In one embodiment, the ESD circuit includes a silicon control rectifier (SCR) ESD circuit. The SCR ESD circuit forms a 4-layered PNPN structure in the substrate. The ESD circuit, in effect, includes first and second switches which are coupled in series between the first and second rails. The first switch, for example, is a PNP switch and the second switch is a NPN switch. The first switch is coupled to the first rail and the second switch is coupled to the second rail. The ESD circuit includes first and second ESD inputs 122a-b. When both switches are closed, a current path is created between the rails. If either one of the switches is opened, no current path exists between the rails.

The control circuit is coupled between the rails. The control circuit includes first and second control outputs 156a-b which are coupled to the ESD inputs. Control output signals are generated at the control outputs by the control circuit to control the switches of the ESD circuit. The control circuit causes the ESD module to operate in a first or a second operating mode. The first mode, for example, is an ESD mode which is activated when an ESD event occurs. The second mode, for example, is a latch-up test mode. In the latch-up test mode, the device operates under conditions which are the same as those in normal operation.

The first rail is coupled to an internal circuit or cell 270. The ESD module protects the cell from an ESD event occurring between the first and second rails. In one embodiment, the cell includes an inverter having first and second transistors 280 and 290 coupled in series between a power rail 202 and the ground rail 108. The power rail, for example, is coupled to $V_{DD}$. Other types of cells may also be useful. In one embodiment, the first transistor is a p-type transistor and the second transistor is a n-type transistor. In one embodiment, the transistors are metal oxide semiconductor (MOS) transistors.

A first terminal of the first transistor is coupled to the high power rail while a second terminal of the first transistor is coupled to a second terminal of the second transistor. The first terminal of the second transistor is coupled to the low power rail. The body of the first transistor is coupled to the first power rail and the body of the second transistor is coupled to the second power rail. An input of the inverter 272 is commonly coupled to the gates of the transistors. An output of the inverter 274 is commonly coupled to the second terminals of the transistors.

Figure 2B:
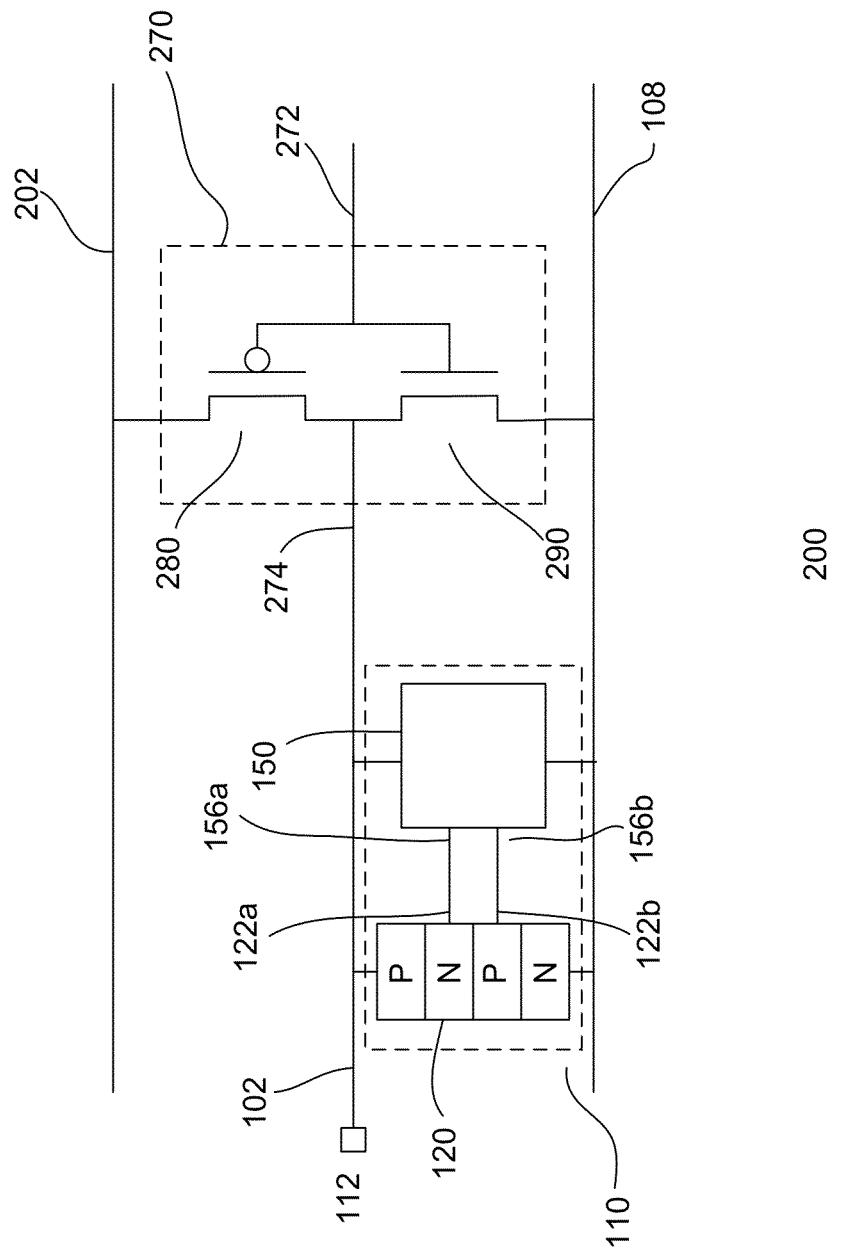

As shown in FIG. 2a, the I/O rail 102 is coupled to the input of the inverter cell. For example, the inverter cell is an input driver having its output coupled to internal circuitry (not shown) of the device. For example, the ESD module prevents a gate oxide break down of the second transistor. In another embodiment, as shown in FIG. 2b, the output of the inverter cell is coupled to the I/O rail 102. For example, the inverter cell is an output driver having its input coupled to internal circuitry (not shown) of the device.

An ESD event may occur at the I/O rail. The ESD event may cause damage to the cell. For example, the ESD event may cause a gate oxide of a transistor, as in the case of FIG. 2a, or a junction of a transistor, as in the case of FIG. 2b, to breakdown or fail. In one embodiment, the ESD event may cause a gate oxide or a junction of the second transistor to breakdown. This occurs when the voltage across the gate oxide or drain junction exceeds the breakdown voltage ($V_{BD}$).

To avoid cell damage from an ESD event, the ESD module operates in the ESD mode when an ESD event is sensed. In the ESD mode, the switches of the ESD circuit are closed. This creates a current path which dissipates the ESD current to ground from the I/O rail. As such, the voltage across the gate oxide or drain junction is kept below $V_{BD}$, protecting it from damage. The control circuit generates first and second active ESD output signals at the first and second ESD outputs to ensure that the switches of the ESD circuit are closed to allow the ESD current to dissipate to ground. In one embodiment, the first active ESD output signal is a logic 0 signal and the second active ESD output signal is a logic 1 signal. Other configurations of active ESD output signals may also be useful.

In the latch-up test mode, the control circuit generates at least one inactive ESD output signals to ensure that one of the switches in the ESD circuit is open. Having at least one switch open results in no current path between the I/O and low power rails, preventing the ESD circuit from suffering latch-up. In one embodiment, the control circuit generates a first inactive ESD output signal at the first control output to ensure that the first switch is open under the latch-up test mode. In one embodiment, the first inactive ESD output signal is a logic 1 signal. As for the second control output signal at the second control output, it is a floated signal. The logic level of the floated signal depends on the previous state. Since the first switch is off, the state of the second switch does not matter. Other configurations of control output signals may also be useful.

Figure 2C:
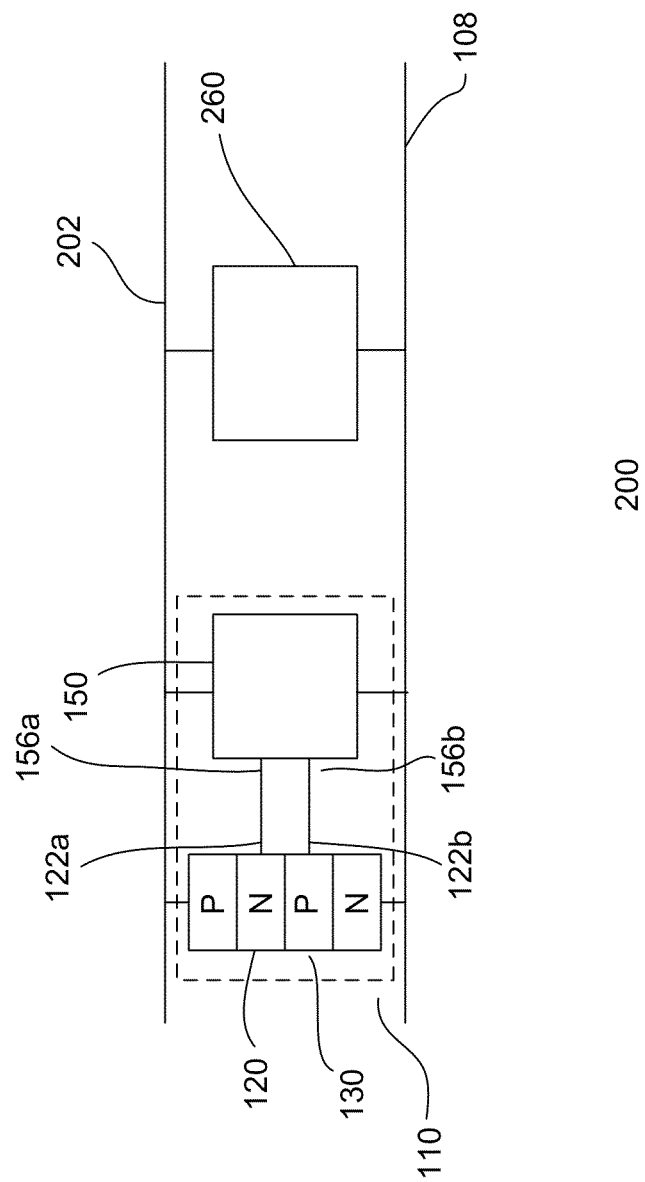

FIG. 2c shows another embodiment of a portion of a device 200. The portion is similar to that described in FIG. 2a. Common elements may not be described or described in detail. In one embodiment, the ESD module 110 is disposed between the first and second power rails 202 and 108. For example, the ESD module is disposed between $V_{DD}$ and $V_{SS}$ rails. The ESD module protects an internal circuit 260 disposed between the power rails from an ESD event occurring at the power rails. The internal circuit can be any circuit element or circuitry disposed between the power rails.

An ESD event may occur at the rails. The ESD event may cause damage to the cell. To avoid damage to the cell caused by an ESD event, the ESD module operates in the ESD mode when an ESD event is sensed. This creates a current path which dissipates the ESD current to ground from the power rail. In the latch-up test mode, the control circuit generates at least one inactive ESD output signals to ensure that one of the switches in the ESD circuit is open. Having at least one switch open results in no current path between the power and ground rails, preventing the ESD circuit from suffering latch-up.

Figure 3:
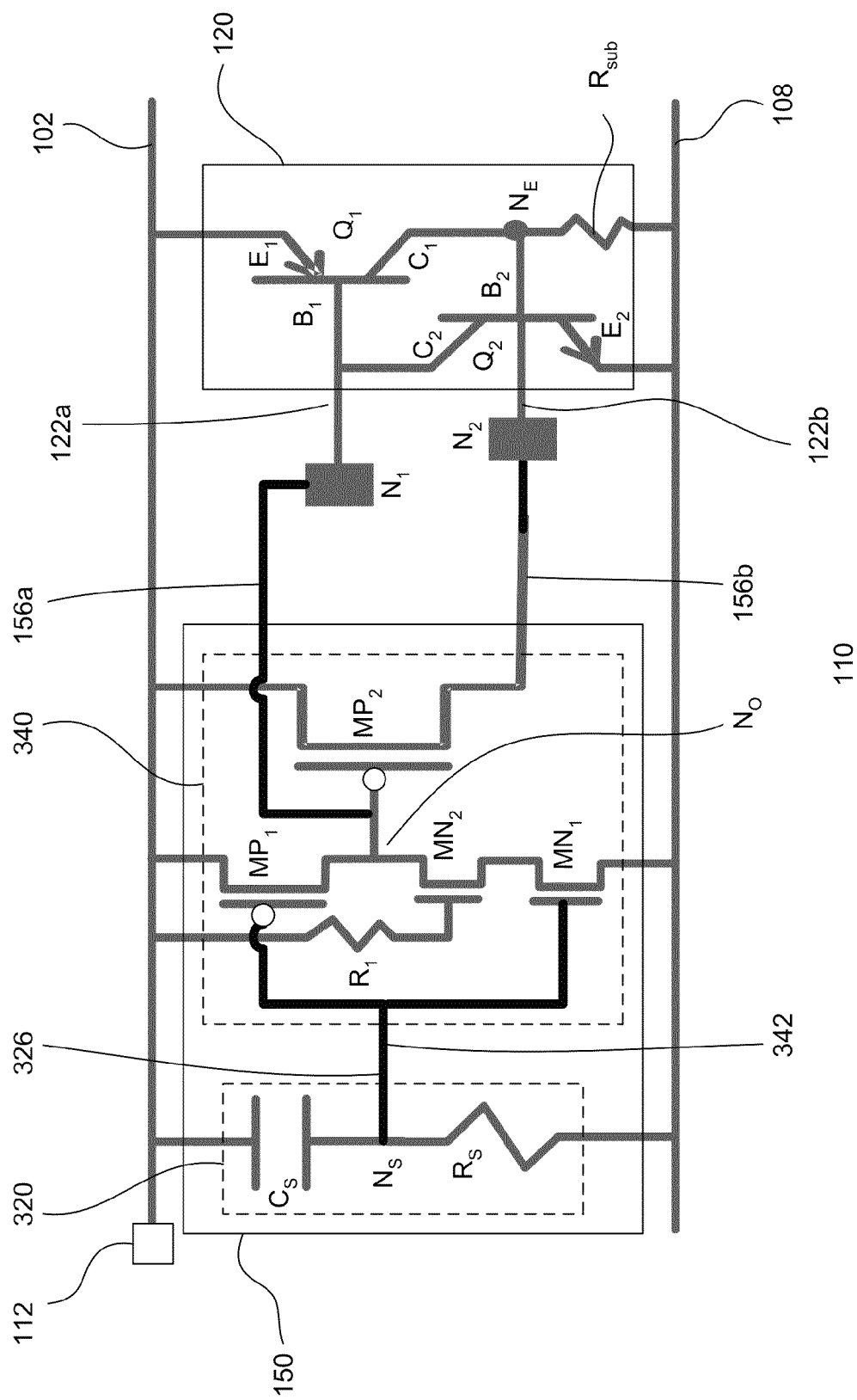
FIG. 3 shows an embodiment of an ESD module.

FIG. 3 shows an embodiment of an ESD module 110. The ESD module is coupled between first and second rails 102 and 108 at which an ESD event may occur. The first rail may be an input/output (I/O) rail of a device. The I/O rail is coupled to an I/O pad 112 of the device. In other embodiments, the first rail may be a high power rail. For example, the first power rail may be coupled to a high power pad 112, such as $V_{DD}$. The second rail, in one embodiment, is a low power rail. For example the second power rail may be coupled to a low (ground) pad or $V_{SS}$.

The ESD module includes a control circuit 150 and an ESD circuit 120. In one embodiment, the ESD circuit includes a silicon control rectifier (SCR) ESD circuit coupled between the rails. The SCR ESD circuit includes first and second bipolar junction transistors (BJTs) $Q_1$ and $Q_2$. The transistors, in effect, are first and second switches coupled in series between the rails. The transistors are formed in a semiconductor substrate, such as silicon. The substrate, for example, may be a p-type substrate. Other types of substrates may also be useful.

In one embodiment, the first transistor $Q_1$ is a PNP transistor having a first emitter terminal $E_1$ coupled to the first power rail and a first collector terminal $C_1$ coupled the second power rail via a substrate resistor $R_{sub}$. The substrate resistor, for example, is the resistance of the p-type substrate. The second transistor $Q_2$ is a NPN transistor having a second collector terminal $C_2$ coupled to a first base terminal $B_1$ of $Q_1$. A second emitter terminal $E_2$ is coupled to the second power rail. A second base terminal $B_2$ is coupled to node $N_E$ between $C_1$ and $R_{sub}$. A first ESD input 122a of the ESD circuit is coupled to $B_1$ and a second ESD input 122b is coupled to $B_2$.

The transistors $Q_1$ and $Q_2$ forms a 4-layered PNPN structure in the substrate between the rails. For example, $B_1$ is n-type and forms p-n junctions with $E_1$ and $C_2$; $B_2$ is p-type and forms p-n junctions with $C_2$ and $E_2$. The first and second ESD inputs 122a-b control the operations of $Q_1$ and $Q_2$. When both transistors are on, a current path exists from the first rail through $E_1$, $B_1$, $B_2$ and $E_2$ to the second rail. If either $Q_1$ or $Q_2$ is off, no current path exists between the power rails. This is also true if both $Q_1$ and $Q_2$ are off.

The control circuit is coupled between the rails. The control circuit includes a sensing section 320 and a secondary section 340. The sensing section is coupled between the rails and includes a sensing output 326. The secondary section includes a secondary input 342 coupled to the sensing output. The secondary section generates first and second control signals at the first and second control outputs 156a-b (e.g., nodes $N_1$ and $N_2$). The first and second control outputs are coupled to the first and second ESD inputs.

The sensing section, when no ESD event is detected, generates an inactive sensing output signal at thee sensing output. In one embodiment, the inactive sensing output signal is a logic 0 signal. Providing other types of inactive sensing output signals may also be useful. The inactive sensing output signal causes the ESD module to operate in the second or latch-up test mode.

In the latch-up test mode, the secondary section generates at least one inactive ESD output signal to ensure that one of the switches in the ESD circuit is open. Having at least one switch open results in no current path between the I/O and low power rails. This prevents the ESD circuit from suffering latch-up. In one embodiment, the control circuit generates a first inactive ESD output signal at the first control output to ensure that $Q_1$ is off. In one embodiment, the first inactive ESD output signal is a logic 1 signal. As for the second control output signal at the second control output, it is a floated signal. The logic level of the floated signal depends on the previous state. Since the first switch is off, the state of the second switch does not matter. Other configurations of control output signals may also be useful.

When an ESD event is detected, the sensing section generates an active sensing output signal at the sensing output. In one embodiment, the active sensing output signal is a logic 1 signal. Providing other types of inactive sensing output signals may also be useful. The active sensing output signal causes the ESD module to operate in the first or ESD mode.

In the ESD mode, the secondary section generates first and second active ESD output signals at the control outputs. The active ESD output signals switches $Q_1$ and $Q_2$ on, creating a current path between the rails to dissipate the ESD current to ground. In one embodiment, the first active ESD output signal at the first control output is a logic 0 signal and the second active ESD output signal at the second control output is a logic 1 signal. Other configurations of active ESD output signals may also be useful.

In one embodiment, the sensing section includes a capacitive element $C_S$ and resistive $R_S$ coupled in series between the rails. The first rail is coupled to $C_S$ and $R_S$ is coupled to the second rail. In one embodiment, $C_S$ has a first terminal coupled to the first rail and $R_S$ has a first terminal coupled to the second rail. The second terminals of the $R_S$ and $C_S$ are commonly coupled to each other at node $N_S$. The sensing output is coupled to $N_S$. The RC time constant $\tau$ of the sensing circuit should be sufficiently large to sense an ESD trigger stimulus. For example, $\tau$ should be able to sense the ESD event. In one embodiment, $\tau$ is less than 1 ms. Preferably, $\tau$ is about 1.0-2.0 μs. Other values of $\tau$ which are capable of sensing ESD trigger stimuli may also be useful.

The secondary section includes first, second and third transistors $MP_1$, $MN_1$, and $MN_2$, which are coupled in series between the rails. In one embodiment, the transistors are MOS transistors configured to function as an inverter. In one embodiment, the first transistor is a p-type transistor while the second and third transistors are n-type transistors. A first terminal of $MP_1$ is coupled to the first rail and a second terminal of $MP_1$ is coupled to a second terminal of $MN_2$. A first terminal of $MN_2$ is coupled to a first terminal of $MN_1$ and a second terminal of $MN_1$ is coupled to the second rail. Stacking $MN_1$ and $MN_2$ increases gate oxide break down voltage of $MN_1$. This advantageously provides additional protection to $MN_1$. The gates of $MP_1$ and $MN_1$ are commonly coupled to $N_S$, which is an input of the inverter. An output of the inverter is the common terminals of $MP_1$ and $MN_2$, which is node $N_O$. The gate of $MN_2$ is coupled to the first rail. In one embodiment, the gate of $MN_2$ is coupled to the first rail via a resistor $R_1$. The resistor R1, for example, may be implemented as a polysilicon resistor. Other types of resistors may also be useful.

The secondary section further includes a fourth transistor $MP_2$. The fourth transistor is, in one embodiment, a p-type MOS transistor. A first terminal of $MP_2$ is coupled to the first rail and a second terminal of the $MP_2$ is coupled to the second control output, which is $N_2$. The output of the inverter or $N_O$ is coupled to the first control output, which is $N_1$.

Figure 4A:
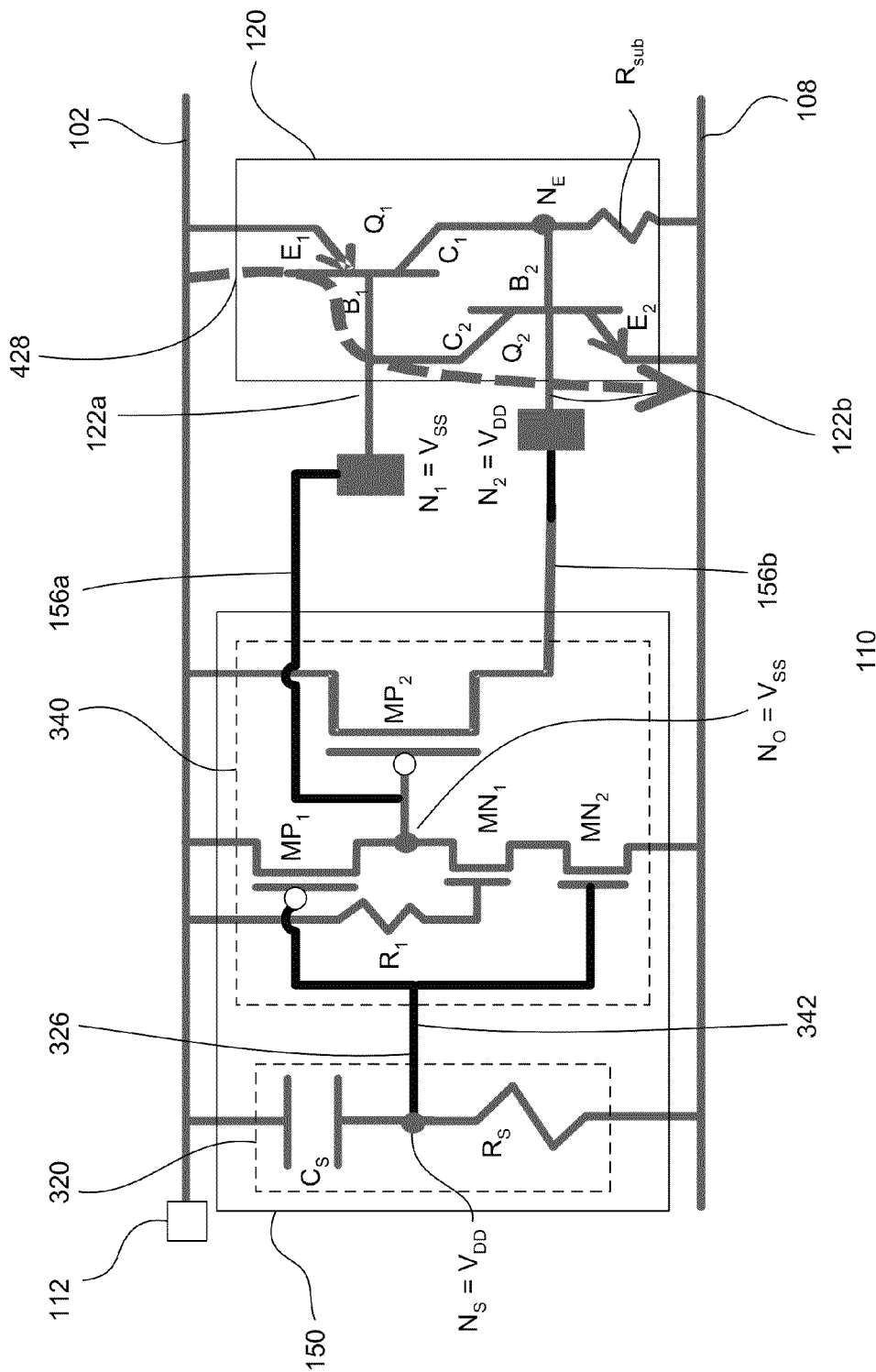
FIGS. 4a-b show an embodiment of an ESD module operating in an ESD or latch-up testing mode.
Figure 4B:
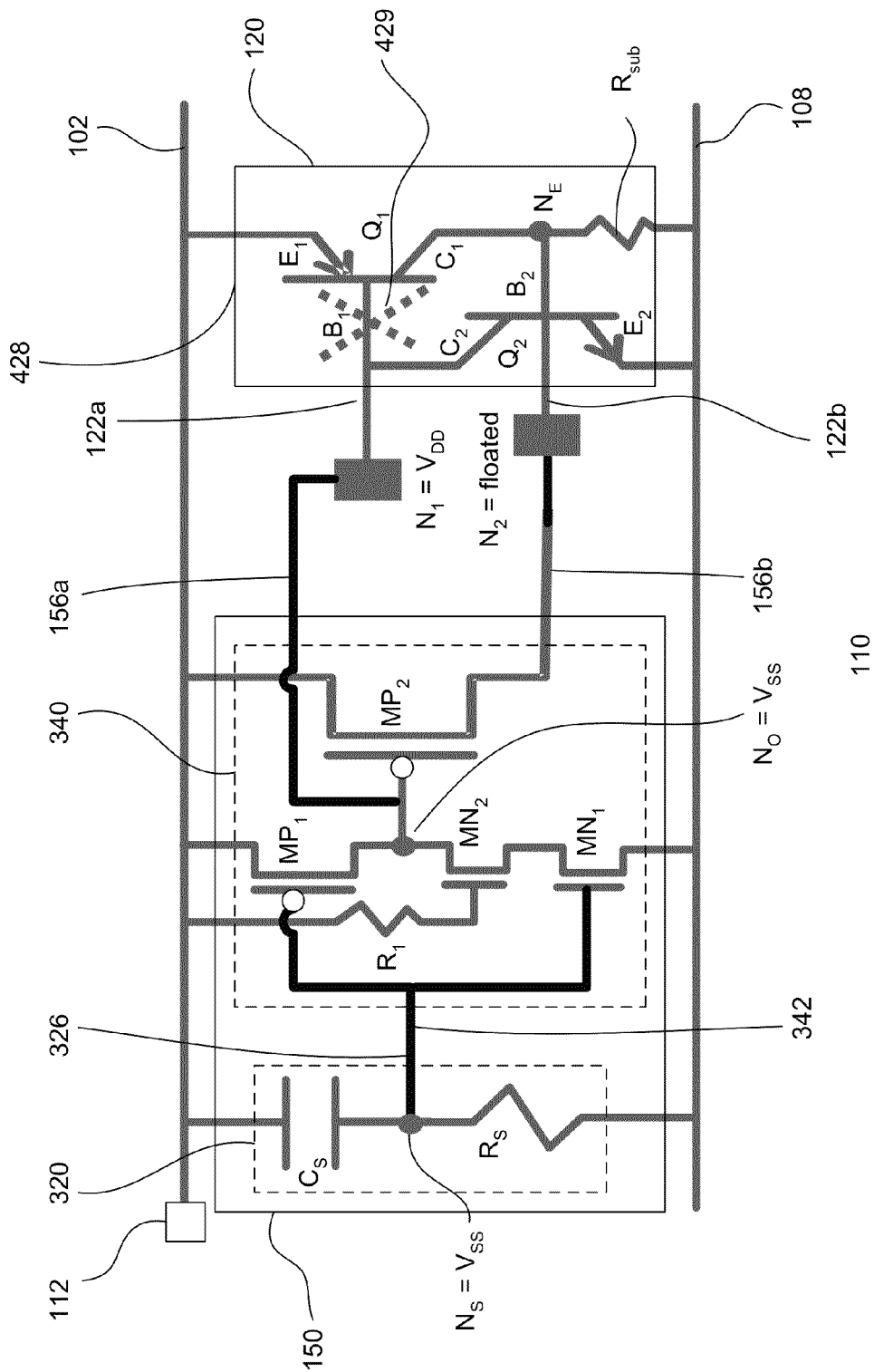

FIGS. 4a-b show an embodiment of an ESD module 110 operating in the first or ESD mode and second or latch-up test mode, respectively. The ESD module is similar to the ESD module described in FIG. 3. Common elements will not be described or described in detail.

Referring to FIG. 4a, when there is an ESD event, the sensing circuit generates an active sensing output signal at $N_S$ to cause the ESD module to operate in the ESD mode. For example, when an ESD event occurs, $C_S$ is conductive to render a connection from $N_S$ to the first rail. As such, the active sensing output signal is a logic 1 signal. The active sensing signal causes $MP_1$ to be switched off and $MN_2$ to be switched on. Since $MN_1$ is coupled to the first rail, it too is switched on. This causes $N_O$ to be coupled to the second rail or $V_{SS}$ (e.g., logic 0). A logic 0 signal at $N_O$ switches $MP_2$ on, coupling $N_2$ to the first rail, which is a logic 1 signal. Furthermore, a logic 0 signal at $N_O$ also results in N1 equal to a logic 0 signal.

In one embodiment, a logic 0 signal at N1 and a logic 1 signal at N2 are active ESD signals provided to the first and second inputs of the ESD circuit. This results in Q1 and Q2 being switched on, forming a current path 428 between the rails to dissipate the ESD current.

As for FIG. 4b, when there is no ESD event, the sensing circuit generates an inactive sensing output signal at $N_S$ to cause the ESD module to operate in the latch-up test mode. For example, when no ESD event occurs, $C_S$ is non-conductive. As such, $N_S$ is coupled to the second rail (e.g., $V_{SS}$). As such, the inactive sensing output signal is a logic 0 signal. The inactive sensing signal causes $MP_1$ to be switched on and $MN_2$ to be switched off. This causes $N_O$ to be coupled to the first rail (e.g., logic 1). As such, $N_1$ is also a logic 1 signal. A logic 1 signal at $N_O$ switches $MP_2$ off, floating $N_2$.

The logic 1 signal at $N_1$ is a first inactive ESD signal which switches $Q_1$ off. This prevents a current path between the rails. The floated signal at $N_2$ does not have any impact since $Q_1$ is off.

As described, an ESD module is provided which protects the device from an ESD event without risks of latch-up. This increases reliability of the device.

The invention may be embodied in other specific forms without departing from the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

What is claimed is:

1. A device having an ESD module, the ESD module comprising:
    an ESD circuit coupled between first and second rails;
    a control circuit coupled between the rails and to the ESD circuit, the control circuit comprising an output stage, the output stage further comprises first, second, third and fourth transistors and first and second control output terminals,
    wherein the control circuit,
        when it senses an ESD event, causes the ESD circuit to create a current path between the rails to dissipate ESD current, and
        when no ESD event is sensed, ensures that no current path is created between the rails to prevent latch-up, and
    wherein
        the first transistor is coupled to the first rail and the second transistor is coupled to the second rail,
        the fourth transistor is coupled in series with the first and second transistors, the fourth transistor is disposed between the first and second transistors, and
        the third transistor having a first terminal directly coupled to the first rail, a second terminal coupled to the second control output terminal and a gate terminal coupled to a first control output stage node;
    the first control output stage node disposed between the first and fourth transistors; and
    the first rail is coupled to a fourth gate terminal of the fourth transistor.

2. The device of claim 1 wherein the ESD circuit comprises:
    first and second switches coupled in series between the rails;
    a first ESD input for controlling the first switch;
    a second ESD input for controlling the second switch; and
    wherein
        the first and second switches are closed when the ESD event is sensed to create the current path between the rails, and
        at least one of the first and second switches is ensured to be opened when no ESD event is sensed.

3. The device of claim 1 wherein the ESD circuit comprises:
    a silicon controlled rectifier (SCR) which forms a PNPN structure in a substrate which effectively forms first and second switches in series between the rails;
    a first ESD input for controlling the first switch; and
    a second ESD input for controlling the second switch.

4. The device of claim 3 wherein the PNPN structure of the SCR comprises:
    a first junction transistor which is a PNP transistor having
        a first emitter terminal coupled to the first rail,
        a first collector terminal coupled to the second rail, and
        a first base coupled to the first ESD input; and
    a second junction transistor which is a NPN transistor having
        a second collector terminal coupled to the first base,
        a second emitter terminal coupled to the second rail, and
        a second base coupled to the second ESD input and to the first collector terminal.

5. The device of claim 4 wherein the current path from the first rail to the second rail is through:
    the first emitter;
    the first base;
    the second collector;
    the second base; and
    the second emitter.

6. The device of claim 4 wherein:
    the first collector terminal is coupled to the second rail via a parasitic resistor formed by the substrate;
    a first base is coupled to the first ESD input; and
    the second ESD input is coupled to the second base and an ESD node formed by the first collector terminal and the parasitic resistor.

7. The device of claim 1 wherein:
    the first rail comprises a power rail or an I/O rail; and
    the second rail comprises a ground rail.

8. The device of claim 7 wherein the ESD circuit comprises:
    a silicon controlled rectifier (SCR) which forms a PNPN structure in a substrate which effectively forms first and second switches in series between the rails;
    a first ESD input for controlling the first switch; and
    a second ESD input for controlling the second switch.

9. The device of claim 8 wherein the PNPN structure of the SCR comprises:
    a first junction transistor which is a PNP transistor having
        a first emitter terminal coupled to the first rail, a first collector terminal coupled to the second rail, and a first base coupled to the first ESD input; and
a second junction transistor which is a NPN transistor having
a second collector terminal coupled to the first base,
a second emitter terminal coupled to the second rail, and
a second base coupled to the second ESD input and to the first collector terminal.

10. The device of claim 1 wherein the control circuit comprises:
a control input stage coupled to the first and second rails, the input stage senses the ESD event, and wherein gate terminals of the first and second transistors are commonly coupled to an input stage output terminal of the control input stage.

11. The device of claim 10 wherein the input stage comprises:
an input capacitor having first and second capacitor terminals, the first capacitor terminal coupled to the first rail; and
an input resistor having first and second resistor terminals, the first resistor terminal coupled to the second rail, the second terminals of the input capacitor and input resistor form a common input stage node which forms an input stage output terminal.

12. The device of claim 11 wherein:
the input capacitor and resistor form an RC input stage circuit having time constant $\tau$ which senses the ESD event;
the input stage generates an active input stage output signal when the input stage senses the ESD event; and
the input stage generates an inactive input stage output signal when there is no ESD event.

13. The device of claim 11 wherein $\tau$ is about 1-2 μs.

14. A device having an ESD module, the ESD module comprising:
an ESD circuit coupled between first and second rails;
a control circuit coupled between the rails and to the ESD circuit,
wherein the control circuit,
when it senses an ESD event, causes the ESD circuit to create a current path between the rails to dissipate ESD current, and
when no ESD event is sensed, ensures that no current path is created between the rails to prevent latch-up,
the control circuit comprises
a control input stage coupled to the first and second rails, the input stage senses the ESD event, and
an output stage, the output stage comprises first, second, third and fourth transistors and first and second control output terminals, wherein
the first transistor of a first polarity type coupled to the first rail and a first gate terminal of the first transistor coupled to an input stage output terminal,
the second transistor of a second polarity type coupled to the second rail and a second gate terminal of the second transistor coupled to the input stage output terminal, the first and second transistors are coupled in series between the first and second rails,
the third transistor of the first polarity type, the third transistor having a first terminal coupled to the first rail, a second terminal coupled to the second control output and a gate terminal coupled to a first control output stage node, and
the fourth transistor is coupled in series with the first and second transistors, the fourth transistor is disposed between the first and second transistors, the first rail is coupled to a fourth gate terminal of the fourth transistor; and
the first control output stage node disposed between the first and fourth transistors, and the first control output coupled to the first control output stage node.

15. The device of claim 14 wherein:
the first and third transistor are p-type transistors; and
the second transistor is a n-type transistor.

16. The device of claim 14 wherein:
the output stage comprises the fourth transistor of the second polarity type.

17. The device of claim 16 wherein:
the first and third transistors are p-type transistors; and
the second and fourth transistors are n-type transistors.

18. The device of claim 10 wherein the control circuit:
when an ESD event is sensed, generates active first and second control output signals at the first and second control output terminals; and
when no ESD event is sensed, generates a first inactive control output signal at the first control output terminal and a second control output signal at the second control output terminal.

19. A method of preventing latch-up in an ESD circuit comprising:
providing an ESD circuit coupled between first and second rails;
providing a control circuit coupled between the rails and to the ESD circuit,
wherein
the control circuit creates a current path in the ESD circuit between the rails to dissipate ESD current when an ESD event is sensed,
the control circuit ensures that no current path is created between the rails in the ESD circuit to prevent latch-up when no ESD event is sensed, and
the control circuit comprises an output stage, the output stage further comprises first, second, third and fourth transistors and first and second control output terminals, and
wherein,
the first transistor is coupled to the first rail and the second transistor is coupled to the second rail,
the fourth transistor is coupled in series with the first and second transistors, the fourth transistor is disposed between the first and second transistors,
the third transistor having a first terminal directly coupled to the first rail, a second terminal coupled to the second control output terminal and a gate terminal coupled to a first control output stage node,
the first control output stage node is provided between the first and fourth transistors, and
the first rail is coupled to a fourth gate terminal of the fourth transistor.

20. A method of forming a device comprising:
providing a substrate; and
forming an ESD module on the substrate comprising,
an ESD circuit coupled between first and second rails,
a control circuit coupled between the rails and to the ESD circuit,
wherein the control circuit,
when it senses an ESD event, causes the ESD circuit to create a current path between the rails to dissipate ESD current,
when no ESD event is sensed, ensures that no current path is created between the rails to prevent latch-up, and the control circuit comprises an output stage, the output stage further comprises first, second, third and fourth transistors and first and second control output terminals, and wherein, the first transistor is coupled to the first rail and the second transistor is coupled to the second rail, the fourth transistor is coupled in series with the first and second transistors, the fourth transistor is disposed between the first and second transistors, the third transistor having a first terminal directly coupled to the first rail, a second terminal coupled to the second control output terminal and a gate terminal coupled to a first control output stage node, the first control output stage node is provided between the first and fourth transistors, and the first rail is coupled to a fourth gate terminal of the fourth transistor.

\* \* \* \* \*